United States Patent
Smith et al.

(10) Patent No.: US 9,391,500 B2
(45) Date of Patent: Jul. 12, 2016

(54) AXIAL FLUX ELECTRIC MACHINE

(75) Inventors: Michael D. Smith, Rogers, AR (US);
William A. Ziegler, Jefferson City, MO (US); Michael Garrett, Cassville, MO (US); Dean James Patterson, Murwillumbah (AU); Roger C. Becerra, Fort Wayne, IN (US); Ludovic Chretien, Columbia City, IN (US); Darrel Buttram, Crane, MO (US); Steven Peter Camilleri, Woolner (AU)

(73) Assignee: Regal Beloit America, Inc., Regal Beloit, WI (US)

( * ) Notice: Subject to any disclaimer, the term of this patent is extended or adjusted under 35 U.S.C. 154(b) by 839 days.

(21) Appl. No.: 13/636,540

(22) PCT Filed: Mar. 22, 2011

(86) PCT No.: PCT/US2011/029378
§ 371 (c)(1),
(2), (4) Date: Nov. 28, 2012

(87) PCT Pub. No.: WO2011/119574
PCT Pub. Date: Sep. 29, 2011

(65) Prior Publication Data
US 2013/0069467 A1    Mar. 21, 2013

Related U.S. Application Data

(60) Provisional application No. 61/316,238, filed on Mar. 22, 2010.

(51) Int. Cl.
*H02K 21/12*    (2006.01)
*H02K 15/00*    (2006.01)
(Continued)

(52) U.S. Cl.
CPC ........... *H02K 21/24* (2013.01); *H02K 1/182* (2013.01); *H02K 1/2793* (2013.01); *H02K 3/522* (2013.01); *Y10T 29/49009* (2015.01)

(58) Field of Classification Search
CPC ..... H02K 1/182; H02K 1/2793; H02K 21/24; H02K 3/522; Y10T 29/49009
USPC ............................ 310/268, 156.08, 216.114
See application file for complete search history.

(56) References Cited

U.S. PATENT DOCUMENTS

| 3,571,637 A | 3/1971 | Henningsen et al. |
| 4,959,578 A | 9/1990 | Varga |

(Continued)

FOREIGN PATENT DOCUMENTS

| GB | 1403522 A | 8/1975 |
| GB | 2255452 A | 11/1992 |

(Continued)

OTHER PUBLICATIONS

Chinese Office Action issued in Chinese Application No. 201180022068.4, mailed Sep. 29, 2014.
(Continued)

*Primary Examiner* — Alex W Mok
(74) *Attorney, Agent, or Firm* — Armstrong Teasdale LLP

(57) ABSTRACT

An electric machine is described. The electric machine includes a rotor comprising a rotor disk and a plurality of permanent magnets magnetically coupled to the rotor disk. The plurality of permanent magnets include a substantially flat profile and are aligned in a substantially planar array. The electric machine also includes a stator comprising a solid stator core and a plurality of coils each wound around a coil insulating member. The stator core includes a plurality of stator teeth extending substantially parallel to an axis of rotation of the rotor.

10 Claims, 17 Drawing Sheets

Figure 2

(51) Int. Cl.
*H02K 1/18* (2006.01)
*H02K 21/24* (2006.01)
*H02K 1/27* (2006.01)
*H02K 3/52* (2006.01)

(56) References Cited

U.S. PATENT DOCUMENTS

| | | | | |
|---|---|---|---|---|
| 5,874,796 | A | 2/1999 | Petersen | |
| 6,707,221 | B2 * | 3/2004 | Carl | H02K 1/182 310/254.1 |
| 7,355,311 | B2 * | 4/2008 | Shimizu | H02K 1/182 310/156.37 |
| 7,906,886 | B2 * | 3/2011 | Jang | H02K 1/148 310/216.133 |
| 2003/0048021 | A1 * | 3/2003 | Frazee | H02K 1/141 310/180 |
| 2006/0028093 | A1 * | 2/2006 | Minagawa | H02K 1/182 310/268 |
| 2010/0019613 | A1 | 1/2010 | Saban et al. | |
| 2010/0225195 | A1 | 9/2010 | Asano et al. | |

FOREIGN PATENT DOCUMENTS

| | | |
|---|---|---|
| WO | 0203527 A2 | 1/2002 |
| WO | 2009043765 A1 | 4/2009 |

OTHER PUBLICATIONS

International Search Report and Written Opinion for co-pending PCT patent application No. PCT/US2011/029378, filed Mar. 22, 2011.
European Search Report, Application No. 11760046.0, dated Feb. 17, 2016, pp. 7.

* cited by examiner

AXIAL FLUX ELECTRIC MACHINE

CROSS REFERENCE TO RELATED APPLICATIONS

This application is a 35 U.S.C. §371 National Stage Application of PCT/US2011/029378, filed Oct. 22, 2010, which claims priority to U.S. Provisional Patent Application No. 61/316,238, filed Mar. 22, 2010, the entire content of each application is incorporated herein by reference.

BACKGROUND OF THE INVENTION

The field of the invention relates generally to a permanent magnet electrical machine, and more specifically, to a permanent magnet electrical machine that includes a planar array of magnets.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mix through the appliance. In other examples, the electric motor powers a blower that distributes air output from the appliance.

A common motor used in such blower systems is an alternating current (AC) induction motor. Typically, the AC induction motor is a radial flux motor, where the flux extends radially from the axis of rotation. Another type of motor that may be used in the blower applications described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor. Motor operating efficiency and economical manufacturing techniques are factors considered when deciding what type of motor to select for use in these applications.

BRIEF DESCRIPTION OF THE INVENTION

In one aspect, an electric machine is provided. The electric machine includes a rotor comprising a rotor disk and a plurality of permanent magnets magnetically coupled to the rotor disk. The plurality of permanent magnets include a substantially flat profile and are aligned in a substantially planar array. The electric machine further includes a stator comprising a solid stator core and a plurality of coils each wound around a coil insulating member. The stator core includes a plurality of stator teeth extending substantially parallel to an axis of rotation of the rotor.

The electric machine may include a stator connection board. Each of the coil insulating members is coupled to the stator connection board. The stator connection board mechanically and electrically couples together the plurality of coils. The machine may also include at least one insulation displacement terminal to facilitate coupling the plurality of coils to the stator connection board. The coil insulating member includes an opening configured to receive the at least one insulation displacement terminal. The coil insulation member may include at least one alignment post for aligning the insulation member and the stator connection board.

The electric machine may also include a stator retention ring configured to secure the stator core between the stator retention ring and an end shield of the machine. The stator retention ring may include at least one stator core alignment feature configured to interact with said stator core to prevent rotation of said stator core. The stator core may include at least one stator core alignment feature configured to interact with the stator core retention ring to prevent rotation of the stator core.

The electric machine may also include a permanent magnet retention system. The permanent magnet retention system may include an outer rim integrated within the rotor disk and configured to prevent the plurality of permanent magnets from moving in a radial direction relative to the rotor disk. The permanent magnet retention system may be integrated within the rotor disk. The permanent magnet retention system may include a permanent magnet retention ring configured to be coupled between the rotor disk and the plurality of permanent magnets. The permanent magnet retention ring is configured to maintain a position of the permanent magnets relative to the rotor disk. The electric machine may also include a rotor disk that includes at least one balancing opening that facilitates balancing of the rotor. The electric machine may be configured for use in a gas burning appliance.

In another aspect, a method for assembling an electric machine is provided. The electric machine includes a rotor and a stator, the stator including a solid stator core that includes a plurality of stator teeth extending substantially parallel to an axis of rotation of the rotor. The method includes magnetically coupling a plurality of permanent magnets to a rotor. The rotor includes a rotor disk and the permanent magnets have a substantially flat profile and are aligned in a substantially planar array. The method also includes winding a coil around each of a plurality of coil insulating members. Each of the plurality of coil insulating members includes an opening. The method also includes positioning at least one of the plurality of stator teeth at least partially within the coil insulating member opening.

The method may further include magnetically coupling a permanent magnet retention ring between the rotor disk and the plurality of permanent magnets. The method may further include mechanically coupling the plurality of coil insulating members to a stator connection board and electrically coupling the plurality of coils to the stator connection board. The method may further include coupling the solid stator core to a machine end shield using a stator retention ring. The method may still further include positioning the electric machine in a gas burning appliance application.

In yet another aspect, a method for calibrating a blower system is provided. The method includes measuring at least one operating parameter of the blower system while providing the machine with a predefined torque command. The method includes providing the measured operating parameters to a computer for processing and determining whether the air flow output by the blower system is within a predefined range of a predetermined air flow specification. Furthermore, the method includes determining a torque command offset value. Moreover, the method includes storing the torque command offset value within the machine or within electronics associated with the machine.

DETAILED DESCRIPTION OF THE INVENTION

Figure 1:
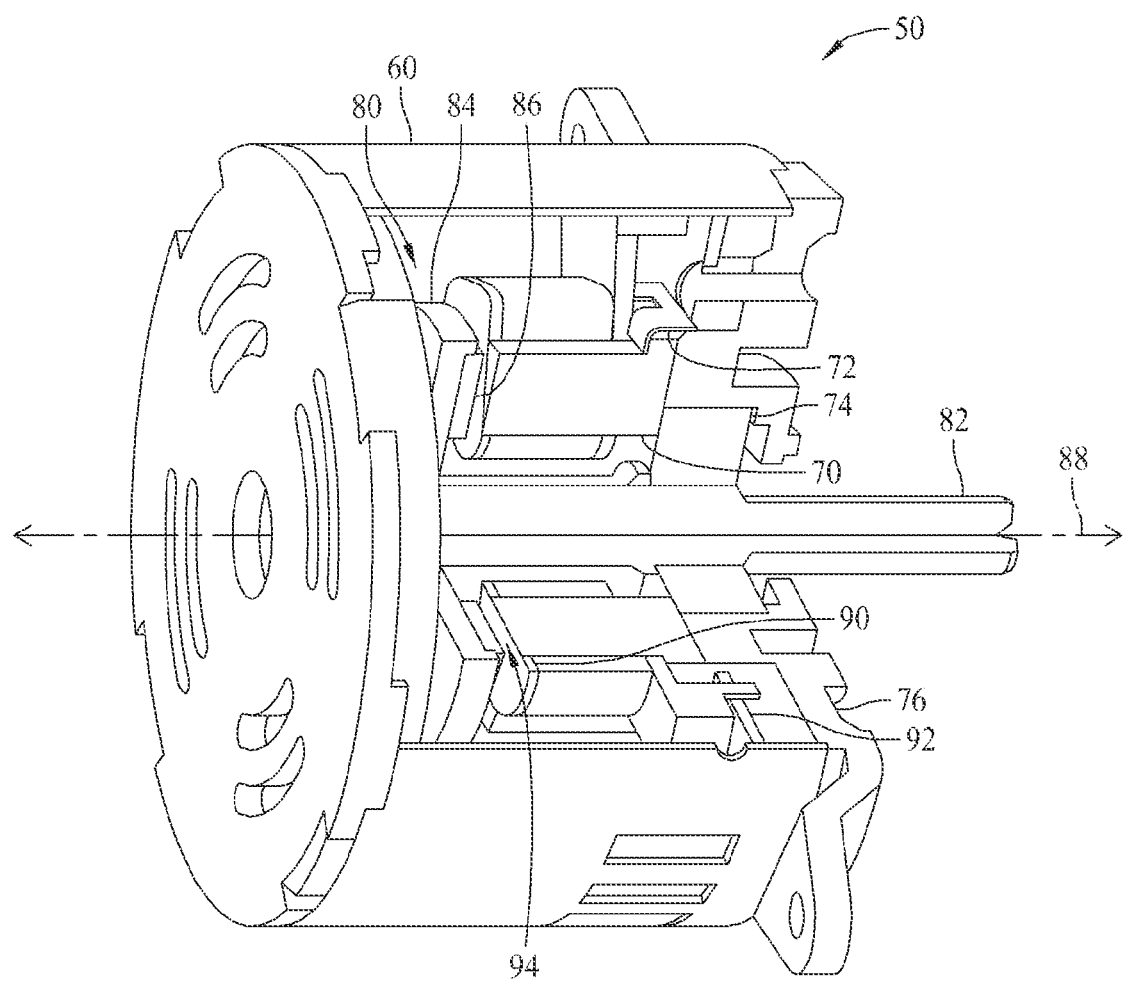
FIG. 1 is a partial cut-away view of an exemplary axial flux machine.
Figure 2:
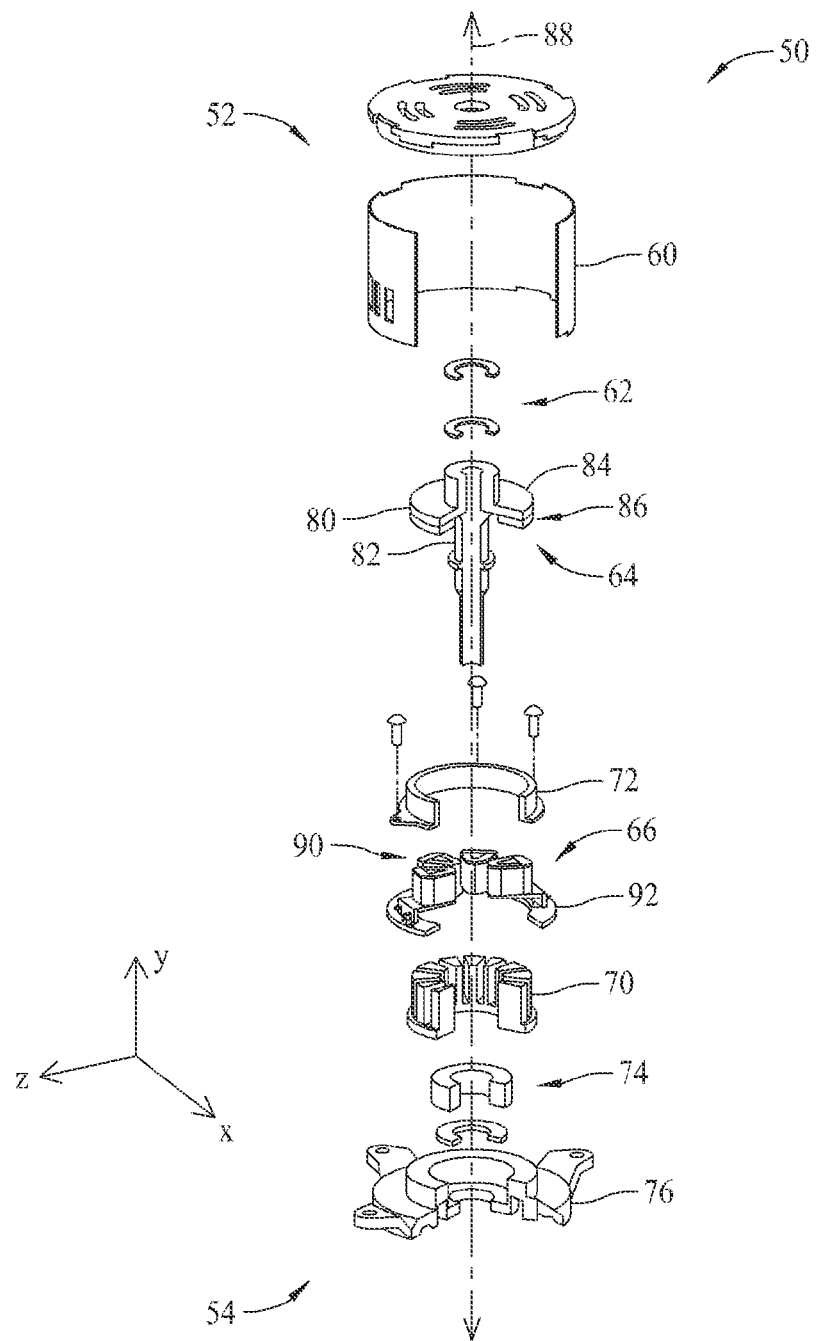
FIG. 2 is an exploded, partially cut-away view of the axial flux machine shown in FIG. 1.

FIG. 1 is a partial cut-away view of an exemplary embodiment of an axial flux electric machine 50. FIG. 2 is an exploded, partially cut-away, view of axial flux electric machine 50. Components common to FIGS. 1 and 2 are identified with the same reference numerals. Components are described herein as including a top surface 52 generally facing what is referred to herein as a top of machine 50, and a bottom surface 54 generally facing what is referred to herein as a bottom of machine 50 (i.e., an end shield of machine 50). In the exemplary embodiment, electric machine 50 is an electric motor, although, electric machine 50 may operate as either an electric motor or an electric generator. In the exemplary embodiment, electric machine 50 includes a housing 60, a first bearing assembly 62, a rotor assembly 64, a bobbin assembly 66, a stator core 70, a stator core retention ring 72, a second bearing assembly 74, and an end shield 76. In the exemplary embodiment, rotor assembly 64 includes a rotor 80 coupled to a shaft 82. Rotor 80 includes a rotor disk 84 and a plurality of permanent magnets 86. Rotor assembly 64 is rotatable within housing 60, and more specifically, rotatable within first bearing assembly 62 and second bearing assembly 74 about an axis 88 of rotation. Furthermore, in the exemplary embodiment, bobbin assembly 66 includes a plurality of coil insulating members 90 (also referred to herein as bobbins) and a stator connection board 92.

In the exemplary embodiment, rotor disk 84 is manufactured using a sintering process from, for example, Soft Magnetic Alloy (SMA) or Soft Magnetic Composite (SMC) materials. In an alternative embodiment, rotor disk 84 is machined and/or cast from, for example, steel.

The plurality of permanent magnets 86 are coupled to rotor disk 84. In the exemplary embodiment, the plurality of permanent magnets 86 are neodymium magnets, although, any suitable permanent magnet may be included that allows electric machine 50 to function as described herein. An air gap 94 exists between bottom surfaces 54 of the plurality of permanent magnets 86 and top surface 52 of stator core 70. A flux within machine 50 extends between the plurality of permanent magnets 86 and stator core 70 in a direction parallel to axis 88. In the exemplary embodiment, the plurality of permanent magnets 86 are symmetrical, which facilitates manufacturing a single magnet design for use as each of the magnets within the plurality of permanent magnets 86. Furthermore, the plurality of permanent magnets 86 have a substantially flat profile which minimizes waste during manufacturing, and therefore, minimizes cost.

Figure 3:
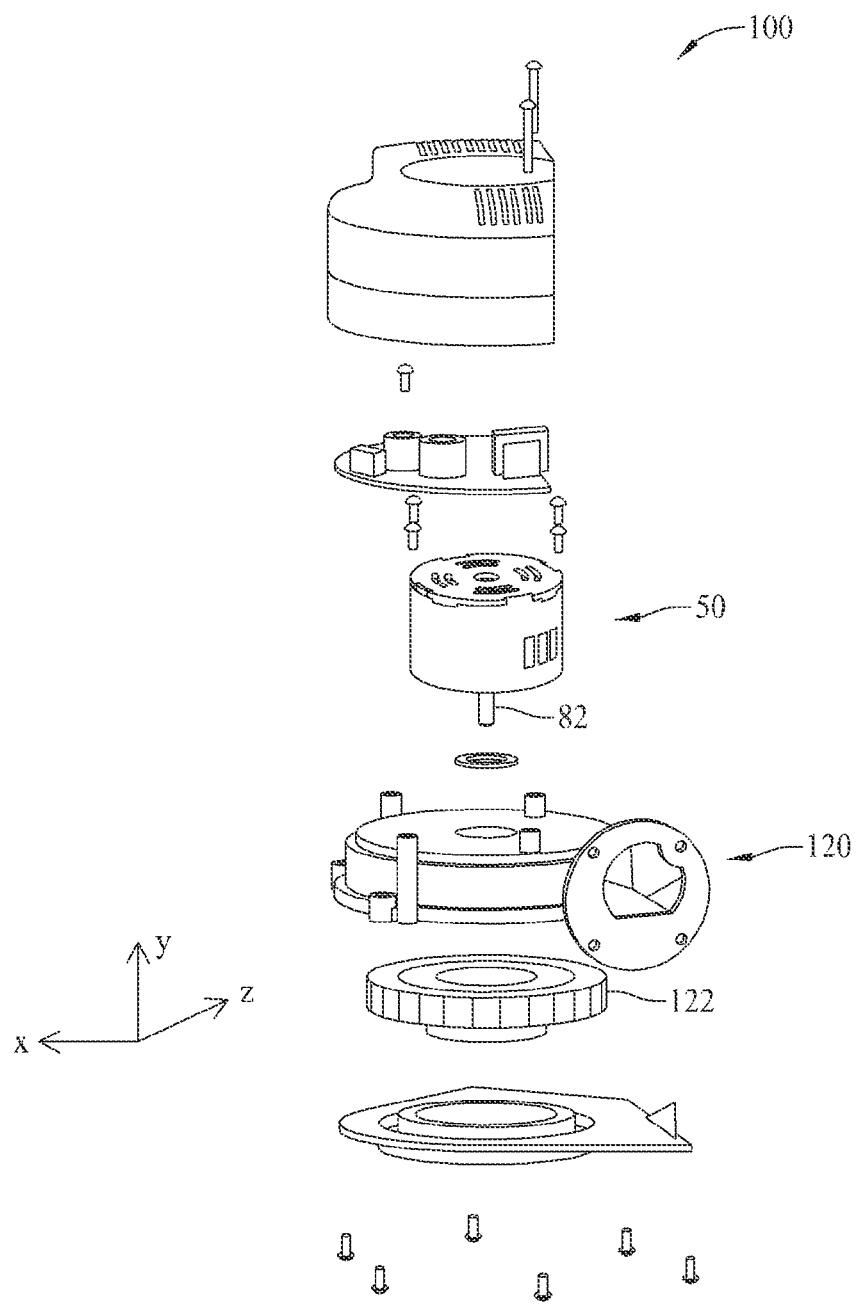
FIG. 3 is an exploded view of a blower system that includes the axial flux machine shown in FIGS. 1 and 2.

FIG. 3 is an exploded view of an exemplary embodiment of a blower system 100. In the exemplary embodiment, blower system 100 includes an axial flux motor, for example, axial flux machine 50, and a blower 120. In the exemplary embodiment, shaft 82 of machine 50 is coupled to a rotatable portion of blower 120, for example, an impeller 122 within blower 120. In an alternative embodiment, rotor disk 84 (shown in FIG. 2) is directly coupled to impeller 122, such that machine 50 does not need to include shaft 82.

In the exemplary embodiment, axial flux machine 50 is controlled by a sine drive controller (not shown in FIG. 3). The sine drive controller produces essentially sine wave currents in the stator winding phases. Furthermore, in the exemplary embodiment, stator core 70 is formed using a sintering process from an SMC material, an SMA material, and/or a powdered ferrite material. Blower system 100 is configured for use in gas burning appliances, for example, but not limited to, water heaters, boilers, pool heaters, space heaters, radiant heaters, and furnaces.

Figure 4:
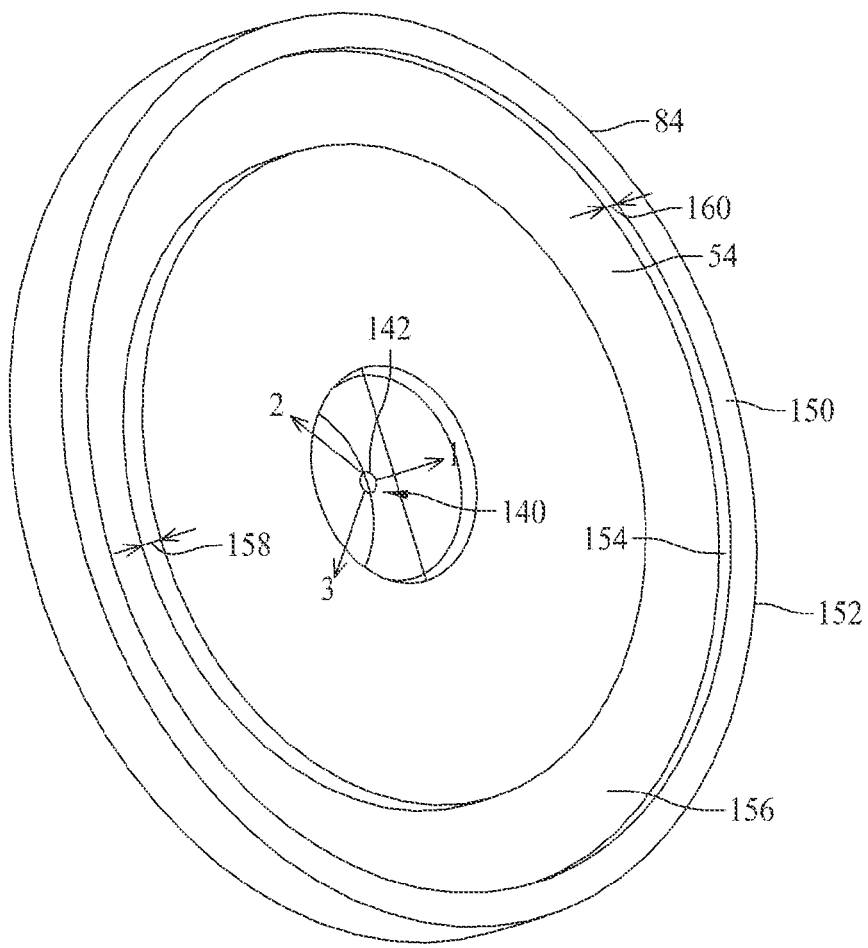
FIG. 4 is a perspective view of an exemplary embodiment of a rotor disk that may be included within the axial flux machine shown in FIGS. 1 and 2.

FIG. 4 is a perspective view of an exemplary embodiment of rotor disk 84 that may be included within machine 50 (shown in FIGS. 1 and 2). In the exemplary embodiment, rotor disk 84 includes a shaft opening 140. Shaft opening 140 shares center 142 with rotor disk 84 and is configured to receive a shaft, for example, shaft 82 (shown in FIGS. 1-3). Rotor disk 84 also includes an outer rim 150 that extends axially from bottom surface 54 of rotor disk 84. In the exemplary embodiment, outer rim 150 is included within a permanent magnet retention system 151. Permanent magnet retention system 151 includes outer rim 150 and a magnet retention ring 180 (shown in FIG. 5). Outer rim 150 includes an outer edge 152 and an inner edge 154. In the exemplary embodiment, rotor disk 84, and more specifically, bottom surface 54, includes a recessed area 156. Recessed area 156 is a ring-shaped area having a depth 158. Recessed area 156 and outer rim 150 are concentric. In the exemplary embodiment, outer rim 150 extends a distance 160 from recessed area 156, wherein distance 160 is greater than depth 158.

Figure 5:
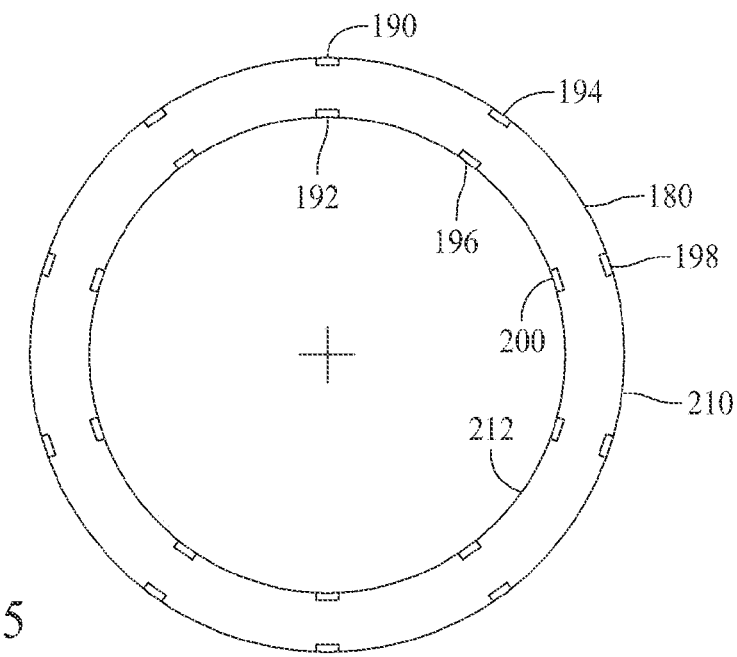
FIG. 5 is a bottom view of an exemplary embodiment of a magnet retention ring that may be included within the axial flux machine shown in FIGS. 1 and 2.
Figure 6:
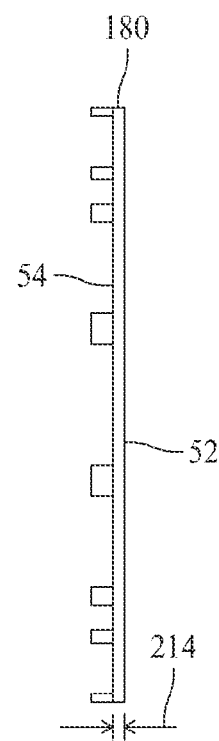
FIG. 6 is a side view of the magnet retention ring shown in FIG. 5.
Figure 7:
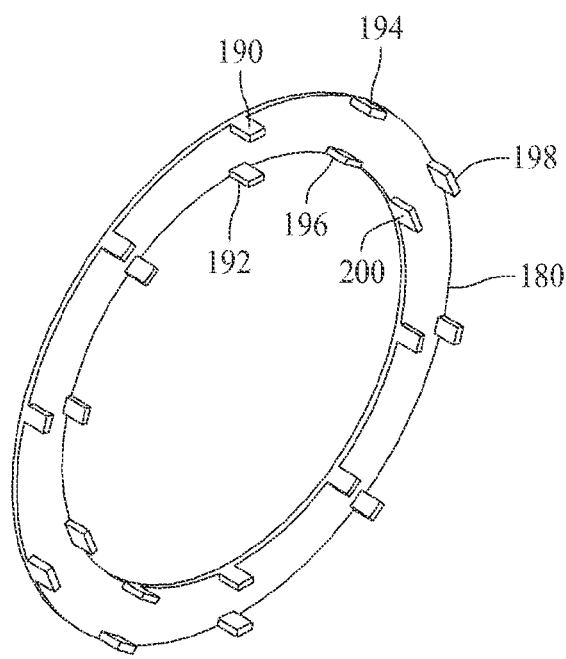
FIG. 7 is a perspective view of the magnet retention ring shown in FIGS. 5 and 6.

FIG. 5 is a bottom view of an exemplary embodiment of magnet retention ring 180. FIG. 6 is a side view of magnet retention ring 180. FIG. 7 is a perspective view of magnet retention ring 180. In the exemplary embodiment, magnet retention ring 180 includes top surface 52 (shown in FIG. 2) and bottom surface 54. Magnet retention ring 180 also includes a plurality of magnet alignment features, for example, tabs 190, 192, 194, 196, 198, and 200. Tabs 190, 192, 194, 196, 198, and 200 are configured to maintain a position of the plurality of permanent magnets 86 relative to rotor disk 84. Magnet retention ring 180 includes an outer edge 210 and an inner edge 212.

In at least some embodiments, magnet retention ring 180 is manufactured from iron, steel, non-ferrous metal, and/or molded plastic. However, magnet retention ring 180 may be manufactured from any material that allows machine 50 to function as described herein. Furthermore, magnet retention ring 180 may be stamped, forged, blanked, or formed using any other suitable process to create a thin ring. Although described above as including a plurality of tabs 190, 192, 194, 196, 198, and 200, magnet retention ring 180 may include ribs, folded fingers, or any similar feature that facilitates maintaining the position of the plurality of permanent magnets 86 and keeping permanent magnets 86 separated. The tabs, ribs, fingers, or other separation features are configured such that they do not cause magnetic shorting of the magnetic fields produced by permanent magnets 86. For example, the separation features may be sized such that shorting of the magnetic fields is minimized. Alternatively, non-ferrous and/or molded plastic separation features may be included, which will not cause shorting of the magnetic fields.

In at least some embodiments, magnet retention ring 180 has a thickness 214 (shown in FIG. 6) that is substantially similar to depth 158 (shown in FIG. 4). Substantially matching thickness 214 of magnet retention ring 180 and depth 158 of recessed area 156 minimizes an air gap between the plurality of permanent magnets 86, magnet retention ring 180, and rotor disk 84. Such an air gap may reduce a torque constant generated by the rotor assembly 64 (shown in FIG. 2).

Figure 8A:
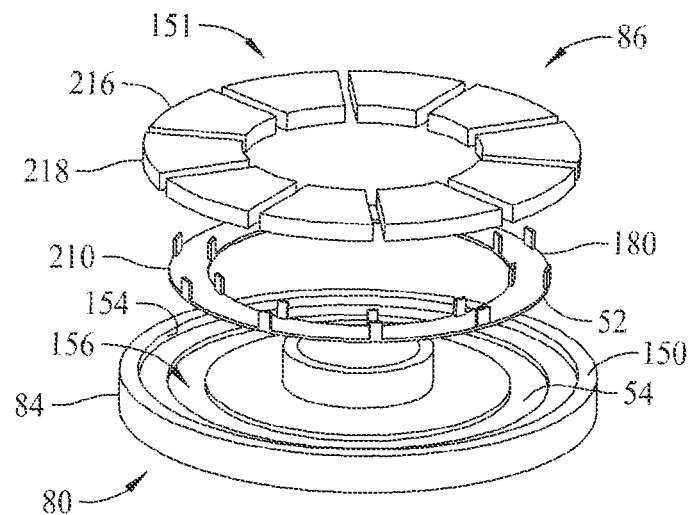
FIG. 8A is a perspective view of an exemplary embodiment of a rotor that may be included within the axial flux machine shown in FIGS. 1 and 2.
Figure 8B:
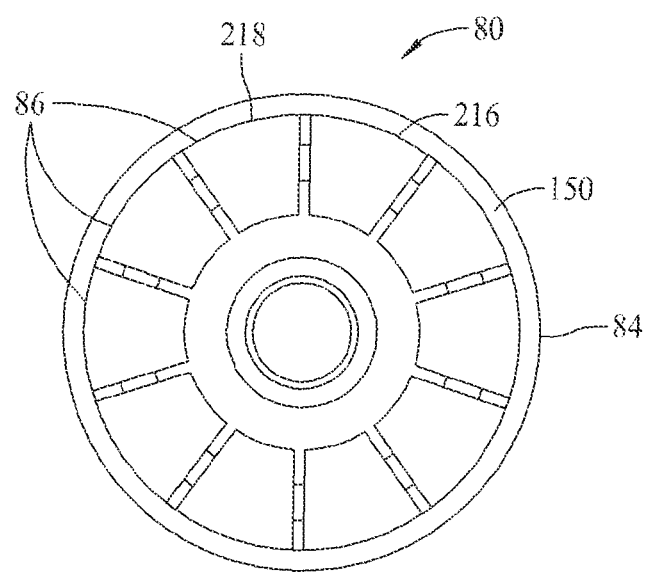
FIG. 8B is a top view of the rotor shown in FIG. 8A.
Figure 8C:
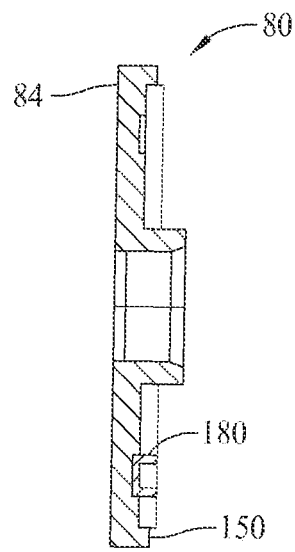
FIG. 8C is a side view of the rotor shown in FIG. 8A.
Figure 8D:
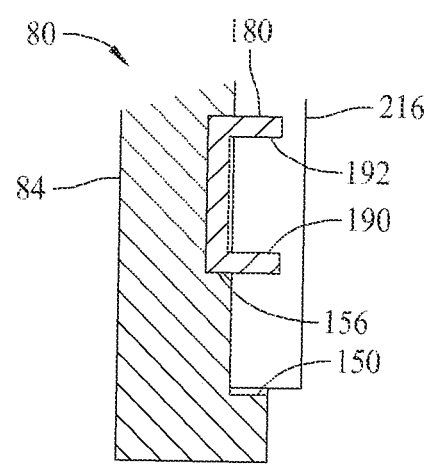
FIG. 8D is a side view of a portion of the rotor shown in FIG. 8A.

FIG. 8A is a perspective view of an exemplary embodiment of rotor 80 (shown in FIG. 2). FIG. 8B is a top view of an exemplary embodiment of rotor 80. FIG. 8C is a side view of an exemplary embodiment of rotor 80. FIG. 8D is a side view of a portion of rotor 80 shown in FIG. 8C. In the exemplary embodiment, rotor 80 includes the plurality of permanent magnets 86 and magnet retention ring 180 coupled to rotor disk 84. The plurality of permanent magnets 86 includes a first permanent magnet 216 and a second permanent magnet 218. In the exemplary embodiment, rotor 80 includes ten permanent magnets, evenly spaced around rotor disk 84. Other embodiments of rotor 80 include any suitable number of permanent magnets that allow machine 50 to function as described here.

In the exemplary embodiment, at least a portion of magnet retention ring 180 fits within recessed area 156 (shown in FIG. 4). More specifically, top surface 52 (shown in FIG. 6) of magnet retention ring 180 is positioned adjacent to bottom surface 54 of rotor disk 84. Outer edge 210 of magnetic retention ring 180 may be positioned adjacent to inner edge 154 of outer rim 150. Alternatively, outer edge 210 of magnetic retention ring 180 may be positioned adjacent to an inner edge of recessed area 156. Magnet retention ring 180 may be secured adjacent to rotor disk 84 by a magnetic force that couples the plurality of permanent magnets 86 to rotor disk 84. Magnet retention ring 180 may also be coupled to rotor disk 84 using an adhesive. The adhesive is not necessary to retain magnet retention ring 180 within recessed area 156, however, the adhesive may reduce fretting corrosion due to vibration during operation.

When rotor disk 84 rotates about axis 88 (shown in FIGS. 1 and 2), forces act on the plurality of permanent magnets 86. Outer rim 150 prevents the plurality of permanent magnets 86 from moving radially outward from center 142. Tabs 190, 192, 194, 196, 198, and 200 maintain a spacing between the plurality of permanent magnets 86. In other words, tabs 190, 192, 194, and 196 prevent first permanent magnet 216 from moving in a tangential direction relative to rotor disk 84. Furthermore, tabs 190, 192, 194, and 196, and outer rim 150 eliminate the need for an adhesive to retain the plurality of permanent magnets 86 in the shaft axis direction while holding the plurality of permanent magnets 86 in the radial and tangential directions. An adhesive may be used to prevent fretting corrosion due to vibration during operation or to couple the plurality of permanent magnets 86 to rotor disk 84 during handling and assembly of machine 50.

Figure 9:
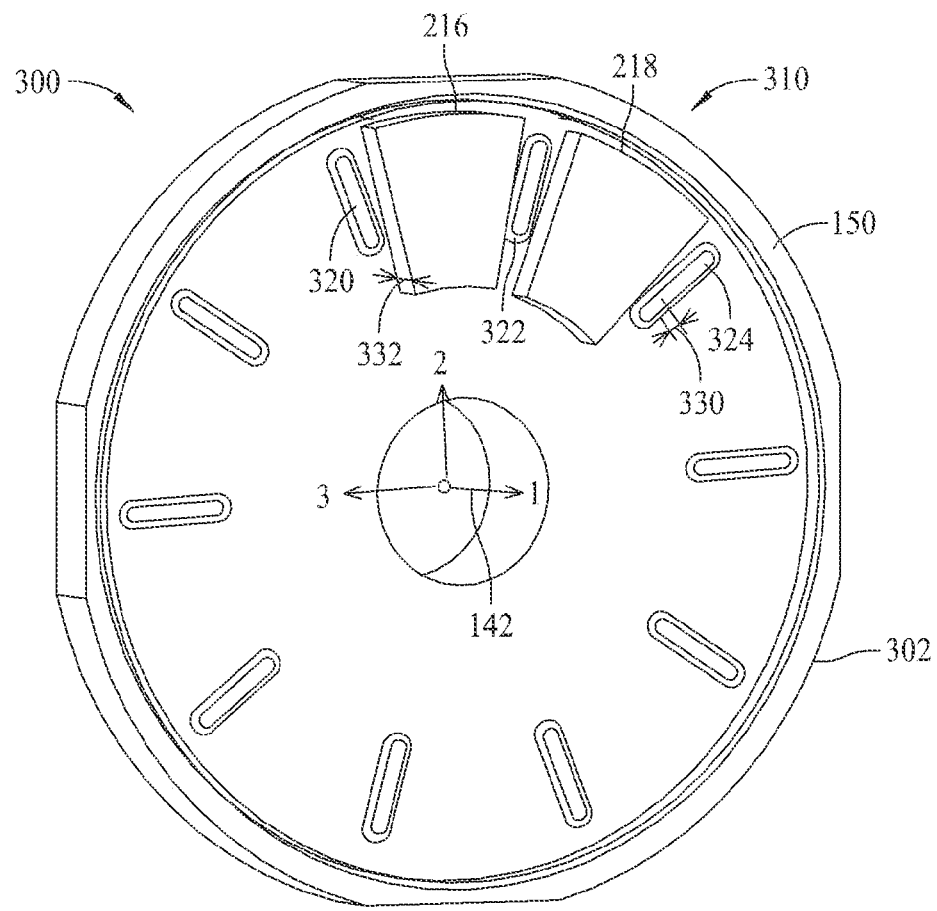
FIG. 9 is a perspective view of an alternative embodiment of a rotor that may be included within the axial flux machine shown in FIGS. 1 and 2.

FIG. 9 is a perspective view of an alternative embodiment 300 of rotor 80 (shown in FIG. 8). In the exemplary embodiment, rotor 300 includes a rotor disk 302 and the plurality of permanent magnets 86, including first permanent magnet 216. As described above with respect to rotor 80, rotor 300 may include any suitable number of permanent magnets that allows machine 50 to function as described herein. Rotor 300 includes an alternative embodiment 310 of permanent magnet retention system 151 (shown in FIG. 8). Permanent magnet retention system 310 includes outer rim 150 and a plurality of ribs, for example first rib 320, second rib 322, and third rib 324. In the exemplary embodiment, outer rim 150 and the plurality of ribs are included within rotor disk 302. In other words, in the exemplary embodiment, rotor disk 302 is a single part, manufactured to include outer rim 150 and ribs 320, 322, and 324. Each of ribs 320, 322, and 324 are radial through center 142 of rotor 300, or offset to allow for various permanent magnet shapes such as, but not limited to, substantially wedge shaped, substantially trapezoidal, substantially arc shaped, or substantially square shaped such as a "bread loaf" shape.

In order for ribs 320, 322, and 324 to not effect air gap 94 (shown in FIG. 1) (i.e., not increase air gap 94), a height 330 of each of ribs 320, 322, and 324 is less than or equal to a thickness 332 of the plurality of permanent magnets 86 if magnetic fringing is not a concern. Alternatively, rib height 330 is further limited when magnetic fringing is a concern. In such a situation, a maximum rib height 330 is limited to a height where magnetic fringing would occur. A minimum rib height 330 is limited to a height suitable for preventing the plurality of permanent magnets 86 from moving over ribs 320, 322, and 324, which would reduce air gap 94 (shown in FIG. 1). For example, rib height 330 is determined such that ribs 320 and 322 maintain the position of first permanent magnet 216 relative to rotor disk 302 and such that rib 322 does not cause magnetic fringing between first permanent magnet 216 and second permanent magnetic 218. In at least some embodiments, rib height 330 is limited to no more than approximately ⅔ of thickness 332 of the plurality of permanent magnets 86 to minimize fringing. Moreover, manufacturing tolerances are included during determination of rib height 330.

First permanent magnet 216 is held in a desired position by first rib 320, second rib 322, and outer rim 150 in a substantially similar manner to that described above with respect to permanent magnet retention system 151. Furthermore, first rib 320, second rib 322, and outer rim 150 eliminate the need for an adhesive to retain first permanent magnet 216 in the shaft axis direction, while also preventing movement of first permanent magnet 216 in the radial and tangential directions. An adhesive may be used to prevent fretting corrosion due to vibration during operation or to hold the plurality of permanent magnets 86 in place during handling and assembly of machine 50.

Figure 10:
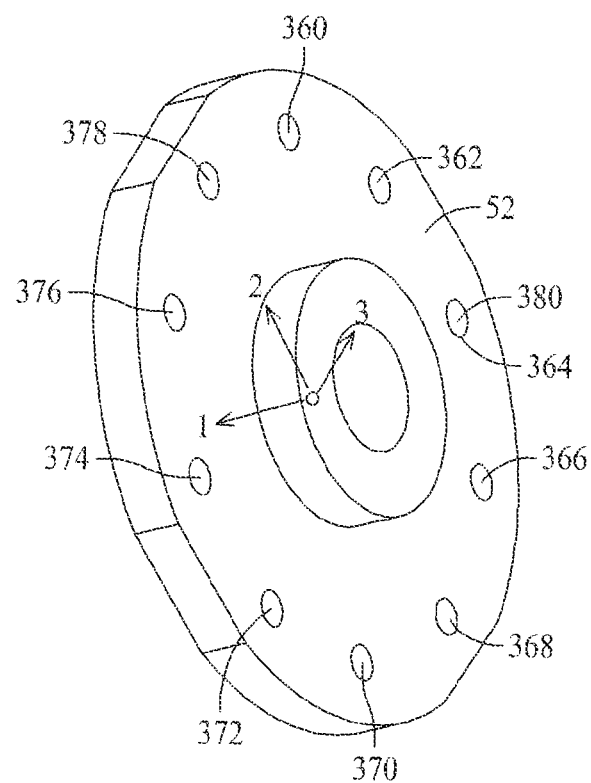
FIG. 10 is a perspective view of a top surface of the rotors shown in FIGS. 8 and 9.

FIG. 10 is a perspective view of top surface 52 of a rotor disk, for example, rotor disk 84 (shown in FIG. 8) and/or rotor disk 302 (shown in FIG. 9), that may be included within machine 50 (shown in FIG. 1). In the exemplary embodiment, top surface 52 of rotor disk 84 includes a plurality of balancing openings, for example, balancing openings 360, 362, 364, 366, 368, 370, 372, 374, 376, and 378, that extend into top surface 52 of rotor disk 84 a predetermined distance 380. Balancing openings 360, 362, 364, 366, 368, 370, 372, 374, 376, and 378 are arranged evenly around top surface 52 of rotor disk 84 and used to balance rotor assembly 64 (shown in FIG. 2). Balancing openings 360, 362, 364, 366, 368, 370, 372, 374, 376, and 378 are shown as having a circular shape, however, balancing openings 360, 362, 364, 366, 368, 370, 372, 374, 376, and 378 may have any shape that enables balancing of rotor assembly 64 as described herein. In the exemplary embodiment, rotor disk 84 is formed within a press using a sintering process. A series of pins (not shown in FIG. 10) form balancing openings 360, 362, 364, 366, 368, 370, 372, 374, 376, and 378 within rotor disk 84. In the exemplary embodiment, rotor disk 84, and rotor assembly 64, may be balanced by adding balancing material (e.g., adhesive, putty, etc.) to certain individual openings of balancing openings 360, 362, 364, 366, 368, 370, 372, 374, 376, and 378. In an alternative embodiment, rotor disk 84 may also be balanced by adjusting the pins in the press to compensate for any imbalance in rotor disk 84. For example, one or more of the pins may be reduced in height, which would result in a pocket that extends a shorter distance 380 into rotor disk 84.

Figure 11:
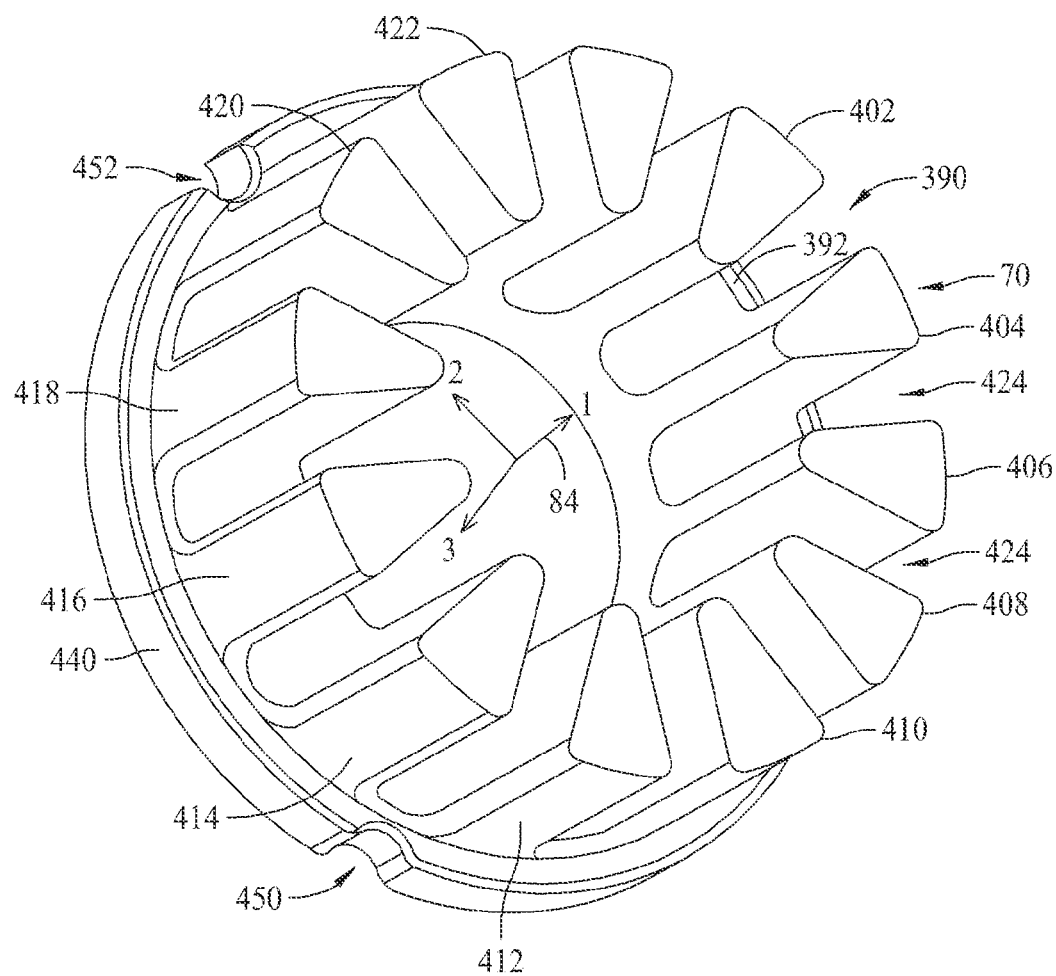
FIG. 11 is a perspective view of an exemplary embodiment of a stator core that may be included within the axial flux machine shown in FIGS. 1 and 2.

FIG. 11 is a perspective view of an exemplary embodiment of stator core 70 (shown in FIG. 2). In the exemplary embodiment, stator core 70 includes a plurality of teeth 390 that extend in an axial direction (i.e., parallel to axis of rotation 88, shown in FIG. 2) from a stator core base 392. In the exemplary embodiment, the plurality of teeth 390 includes a first tooth 400, a second tooth 402, a third tooth 404, a fourth tooth 406, a fifth tooth 408, a sixth tooth 410, a seventh tooth 412, an eighth tooth 414, a ninth tooth 416, a tenth tooth 418, an eleventh tooth 420 and a twelfth tooth 422. Although described as including twelve teeth, stator core 70 may include any suitable number of teeth that allow machine 50 to function as described herein. In use, stator core base 392 is disposed perpendicularly about rotational axis 88 and the plurality of teeth 390 extend axially from stator core base 392 and form a slot 424 between each adjacent tooth of the plurality of teeth 390. In the exemplary embodiment, stator core 70 includes a flange 440 extending at least partially around an outside diameter of stator core 70. Flange 440 may extend entirely around stator core 70, or may extend only partially around stator core 70. Flange 440 may also include a first section extending partially around stator core 70 and a second section extending partially around stator core 70. Flange 440 may include any number of sections that allows machine 50 to function as described herein.

Figure 12:
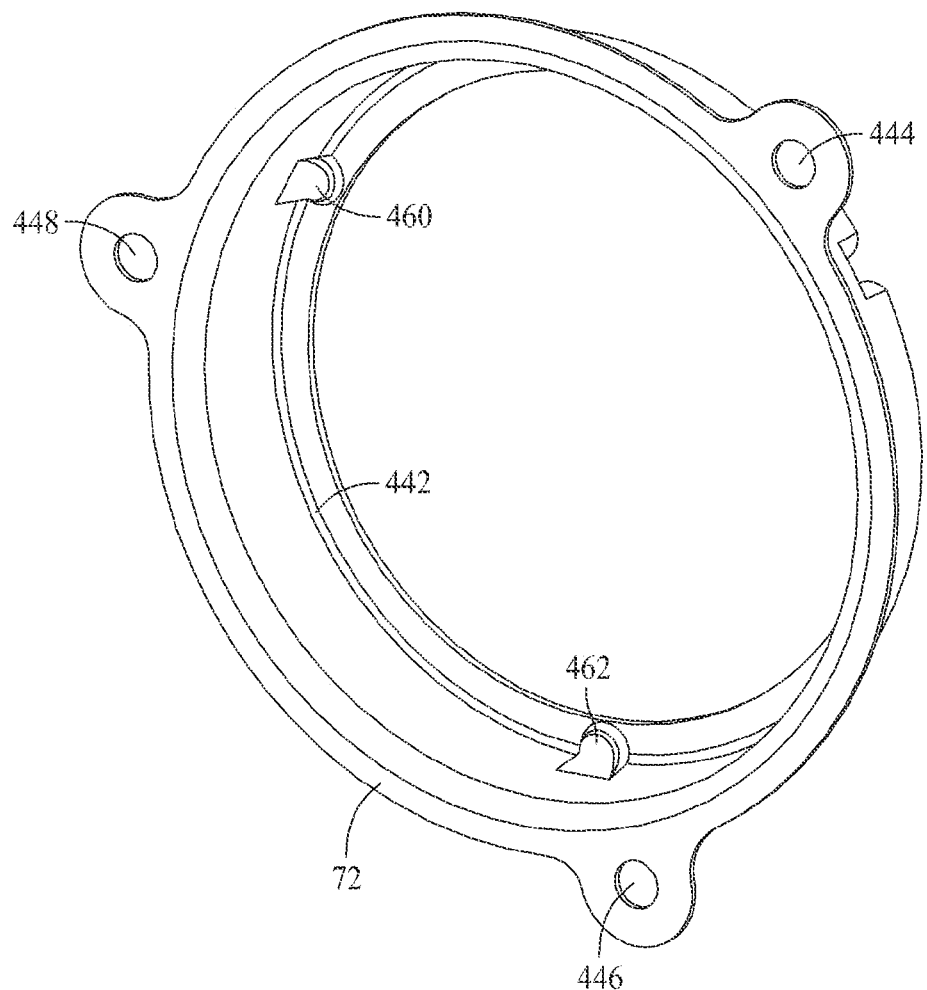
FIG. 12 is a perspective view of an exemplary embodiment of a stator retention ring that may be included within the axial flux machine shown in FIGS. 1 and 2.

FIG. 12 is a perspective view of an exemplary embodiment of stator retention ring 72 (shown in FIG. 2). In the exemplary embodiment, stator retention ring 72 includes a lip 442. Lip 442 may extend entirely around stator retention ring 72, or may extend only partially around stator retention ring 72. Furthermore, lip 442 may include a first section and a second section, each extending partially around stator retention ring 72. Bottom surface 54 of lip 442 is configured to align with flange 440 of stator core 70. When stator retention ring 72 is positioned around stator core 70 and is coupled to end shield 76 (shown in FIG. 2), stator core 70 is secured between stator retention ring 72 and end shield 76. In the exemplary embodiment, stator retention ring 72 includes fastener openings 444, 446, and 448. Fastener openings 444, 446, and 448 align with openings within end shield 76 (shown in FIG. 2) such that a fastener 449 (shown in FIG. 2), for example, a threaded fastener, can couple stator retention ring 72 to end shield 76. Although described as using threaded fasteners to couple stator retention ring 72 and end shield 76, any type of suitable fastener may be used that allows machine 50 to function as described herein.

In the exemplary embodiment, flange 440, in combination with stator core retention ring 72, enables stator core 70 to be coupled to end shield 76 without an adhesive between stator core 70 and end shield 76 or threaded fasteners passing directly through and/or into stator core 70 and into end shield 76. In other words, stator core 70 is coupled to end shield 76 without the need for adhesives or screws into the stator core 70. Securing stator core 70 in position adjacent to end shield 76 in this manner facilitates increasing reliability when compared to adhesively coupling stator core 70 to end shield 76. Stator retention ring 72 and stator core 70 also prevent damage to stator core 70 that may be caused by using, for example, a threaded fastener into or through stator core 70 due to the relatively weak stator core material, which also leaves stator core 70 prone to thread failure.

In the exemplary embodiment, stator core 70 includes a plurality of alignment features, for example, a first notch 450 and a second notch 452. Furthermore, in the exemplary embodiment, stator retention ring 72 includes a plurality of corresponding alignment features, for example, a first protrusion 460 and a second protrusion 462, configured to align with first notch 450 and second notch 452, respectively. The alignment features within stator core 70 and stator retention ring 72 prevent stator core 70 from rotating due to magnetic forces present during operation of machine 50. Furthermore, the alignment features provide positive rotational alignment of stator core 70 within machine 50 during assembly of machine 50. Stator retention ring 72 may be manufactured from a variety of metals or plastics with elastic or non-elastic properties to absorb manufacturing tolerance accumulation.

In the exemplary embodiment, stator core 70 is a solid core. More specifically, as defined herein, a solid core is a non-laminated core. Furthermore, a solid core may be a complete, one-piece component, or may include multiple non-laminated sections coupled together to form a complete solid core. For example, stator core 70 may be constructed of an SMC or an SMA material. Such materials allow for 3-dimensional flux paths and facilitate reducing high frequency losses (e.g., losses at frequencies above 60 Hz) when compared with laminated stator cores. Use of the sintered SMC or SMA also facilitates increasing control of air gap 94 (shown in FIG. 1) which improves performance and minimizes noise.

Figure 13:
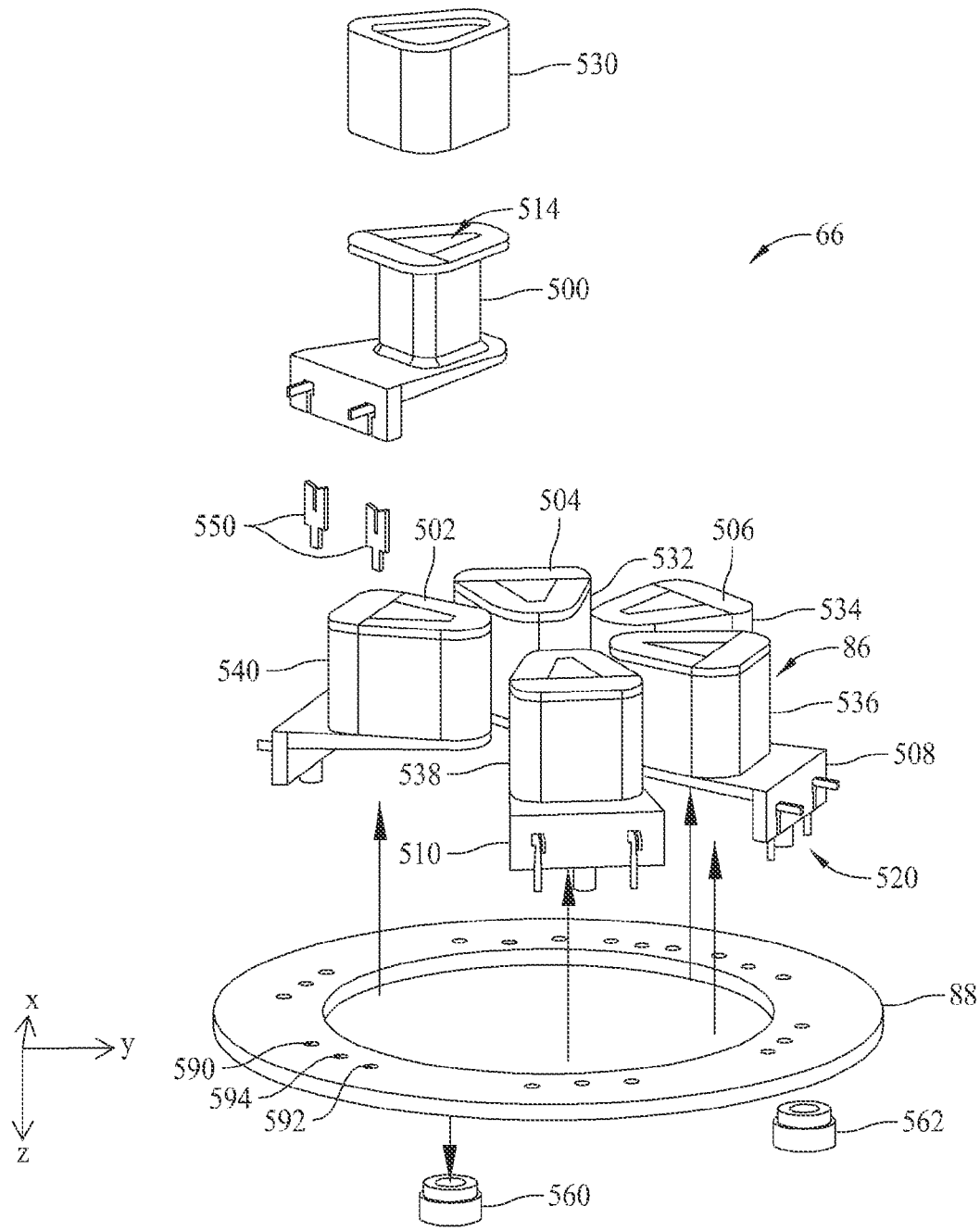
FIG. 13 is an exploded view of an exemplary embodiment of a bobbin assembly that may be included within the axial flux machine shown in FIGS. 1 and 2.

FIG. 13 is an exploded view of an exemplary embodiment of bobbin assembly 66, shown in FIG. 2. In the exemplary embodiment, bobbin assembly 66 includes the plurality of bobbins 90 and stator connection board 92. In the exemplary embodiment, the plurality of bobbins 90 includes a first bobbin 500, a second bobbin 502, a third bobbin 504, a fourth bobbin 506, a fifth bobbin 508, and a sixth bobbin 510. Although described as including six bobbins, bobbin assembly 66 may include any number of bobbins that allows machine 50 to function as described herein. Each of bobbins 500, 502, 504, 506, 508, and 510 includes an opening 514 that closely conforms to an external shape of the plurality of stator core teeth 390 (shown in FIG. 4). For example, first stator tooth 400 is configured to be positioned at least partially within opening 514 of first bobbin 500. Furthermore, third stator tooth 404 is configured to be positioned at least partially within opening 514 of second bobbin 504. Machine 50 may include one bobbin per tooth, or one bobbin positioned on every other tooth.

In the exemplary embodiment, bobbin assembly 66 also includes an electrical winding 520 that includes a plurality of coils, for example, a first coil 530, a second coil 532, a third coil 534, a fourth coil 536, a fifth coil 538, and a sixth coil 540. In the exemplary embodiment, winding 520 is made up of the six coils 530, 532, 534, 536, 538, and 540 and creates a twelve-pole stator. Each coil 530, 532, 534, 536, 538, and 540 is wound around a respective bobbin 500, 502, 504, 506, 508, and 510. Each bobbin 500, 502, 504, 506, 508, and 510 electrically isolates one of coils 530, 532, 534, 536, 538, and 540 from a respective stator tooth of the plurality of stator teeth 390.

In the exemplary embodiment, coils 530, 532, 534, 536, 538, and 540 are wound around bobbins 500, 502, 504, 506, 508, and 510. Each of coils 530, 532, 534, 536, 538, and 540 include two ends, a start and a finish to the coil. The bobbins 500, 502, 504, 506, 508, and 510 are coupled to stator connection board 92. In the exemplary embodiment, stator connection board 92 is a printed circuit board (PCB). In the exemplary embodiment, each end of each of coils 530, 532, 534, 536, 538, and 540 is coupled to stator connection board 92 using an insulation displacement terminal 550 designed for directly soldering into stator connection board 92. In at least some embodiments, terminal 550 may be a Siameze terminal manufactured by Tyco Electronics Ltd., although, any other suitable connector may be used that allows the plurality of bobbins 90 to be coupled to stator connection board 92 as described herein. In the exemplary embodiment, bobbin assembly 66 is manufactured as a complete component using printed circuit board processes using through-hole technology. In the exemplary embodiment, insulation displacement terminals 550 facilitate electrically coupling each of coils 530, 532, 534, 536, 538, and 540 to stator connection board 92, and also mechanically coupling each of the plurality of bobbins 90 to stator connection board 92 before and after soldering. In the exemplary embodiment, stator connection board 92 includes a standard wiring connector (not shown in FIG. 13) for directly connecting stator connection board 92 to a motor control board. In an alternative embodiment, stator connection board 92 is incorporated within a motor control board, thereby eliminating redundant mounting and connectors. Moreover, in the exemplary embodiment, bobbin assembly 66 also includes at least one spacer, for example, first spacer 560 and a second spacer 562. First spacer 560 and second spacer 562 are coupled to stator connection board 92 and maintain a distance between stator connection board 92 and end shield 76. In some embodiments, spacers 560 and 562 each include an opening configured to allow fastener 449 (shown in FIG. 2) to pass through.

Figure 14:
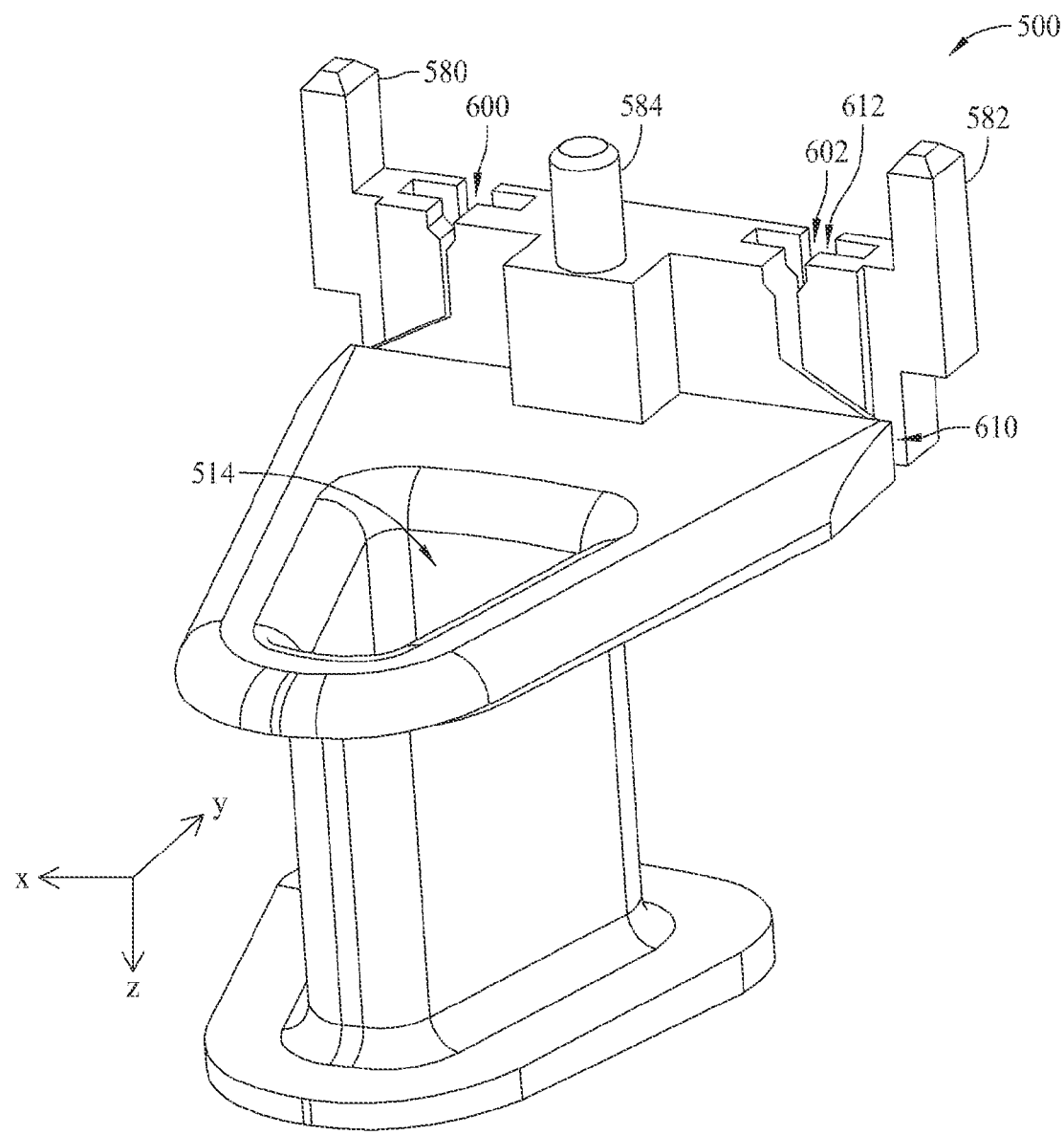
FIG. 14 is a perspective view of an exemplary embodiment of a bobbin that is included within the bobbin assembly shown in FIG. 13.

FIG. 14 is a perspective view of an exemplary embodiment of bobbin 500, also shown in FIG. 13. In the exemplary embodiment, bobbin 500 includes alignment posts 580, 582, and 584. Alignment posts 580, 582, and 584 are configured to interact with corresponding stator connection board 92 features, for example, a first opening 590, a second opening 592, and a third opening 594 (shown in FIG. 13). Posts 580, 582, and 584, in combination with first opening 590, second opening 592, and third opening 594, facilitate proper coupling of bobbin 500 and stator connection board 92. Although described as including three alignment posts, bobbin 500 may include any number of alignment posts that allow bobbin 500 to be properly aligned with stator connection board 92.

In the exemplary embodiment, bobbin 500 also includes a first terminal opening 600 and a second terminal opening 602. Each terminal opening 600 and 602 is configured to receive at least a portion of insulation displacement terminal 550. A first end (not shown in FIG. 14) of coil 530 is positioned at least partially within a first slit 610 and at least partially within a second slit 612. Slit 612 is perpendicular to second terminal opening 602. Second slit 612 facilitates aligning the first end of coil 530 in a manner that allows insulation displacement terminal 550 to electrically couple with the first end of coil 530 when positioned within second terminal opening 602.

Although described above as including insulation displacement terminals 550, in an alternative embodiment, bobbin assembly 66 does not include insulation displacement terminals 550. In the alternative embodiment, the ends of each of coils 530, 532, 534, 536, 538, and 540 are coupled directly to stator connection board 92, for example, through an electrical hole in a printed circuit board. The ends are then soldered to complete the electrical circuit and mechanically couple bobbin 500 to stator connection board 92.

Figure 15:
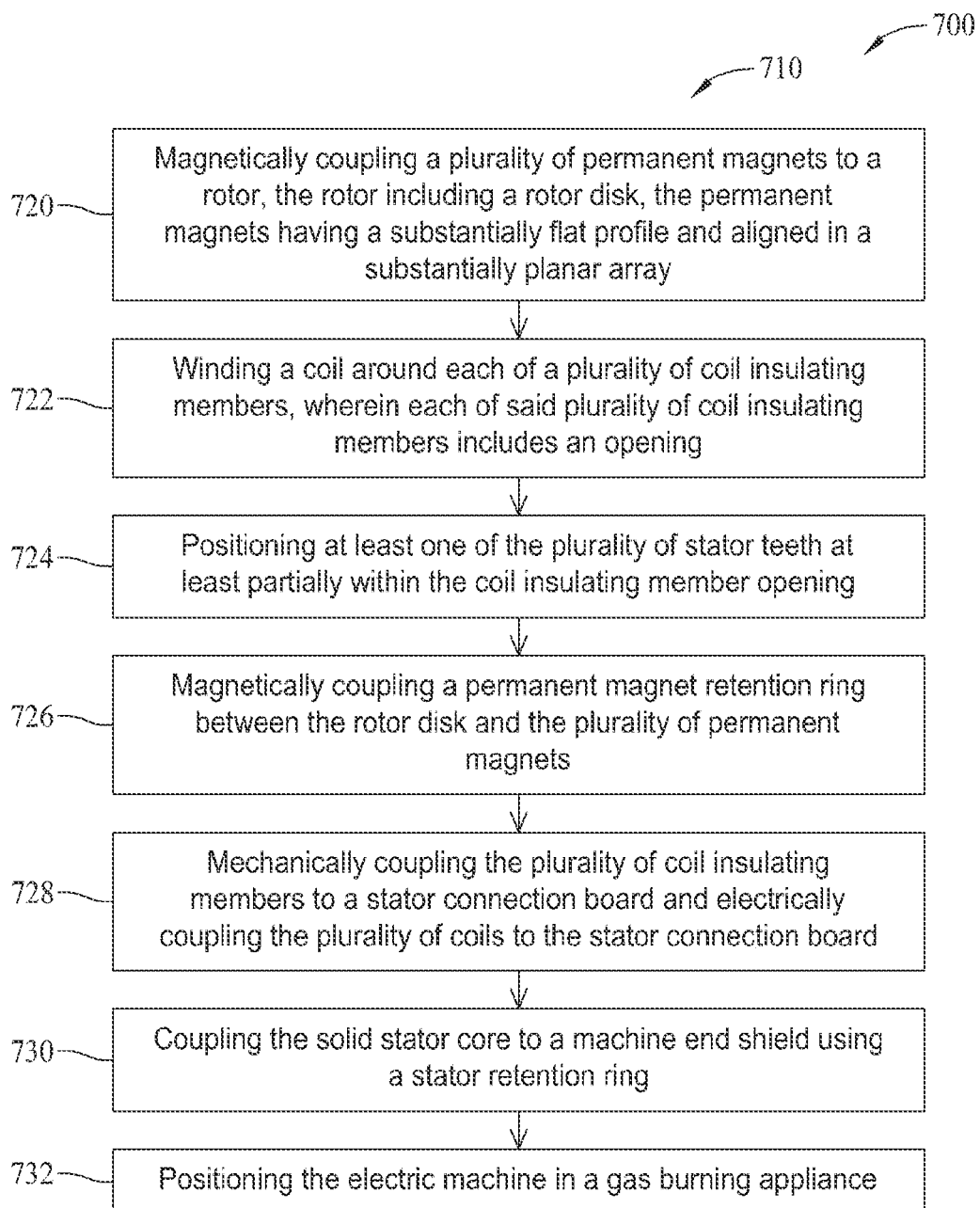
FIG. 15 is a flow chart of an exemplary method of assembling an electric machine, for example, the electric machine shown in FIG. 1.

FIG. 15 is a flow chart 700 of an exemplary method 710 of assembling an electric machine, for example, electric machine 50 (shown in FIG. 1). Method 710 includes magnetically coupling 720 a plurality of permanent magnets to a rotor, for example, plurality of permanent magnets 86 (shown in FIG. 2) to rotor 80 (shown in FIG. 2). As described above, rotor 80 includes rotor disk 84 and the plurality of permanent magnets 86 include a substantially flat profile and are aligned in a substantially planar array. Method 710 also includes winding 722 a coil around each of a plurality of coil insulating members, wherein each of said plurality of coil insulating members includes an opening. For example, method 710 may include winding 722 coils 530, 532, 534, 536, 538, and 540 (shown in FIG. 13) around bobbins 500, 502, 504, 506, 508, and 510 (shown in FIG. 13), respectively. Each of bobbins 500, 502, 504, 506, 508, and 510 include an opening 514 (shown in FIG. 13). Method 710 also includes positioning 724 at least one of a plurality of stator teeth, for example, at least one of the plurality of stator teeth 390 (shown in FIG. 11) at least partially within coil insulating member opening 514.

In some embodiments, method 710 may further include magnetically coupling 726 a permanent magnet retention ring, for example, permanent magnet retention ring 180 (shown in FIG. 8), between rotor disk 84 and the plurality of permanent magnets 86. Method 710 may also include mechanically coupling 728 the plurality of coil insulating members to a stator connection board, for example, stator connection board 92 (shown in FIG. 2), and electrically coupling the plurality of coils to stator connection board 92.

In some embodiments, method 710 may further include coupling 730 a solid stator core, for example, stator core 70 (shown in FIG. 2), to a machine end shield, for example, end shield 76 (shown in FIG. 2), using a stator retention ring, for example, stator retention ring 72 (shown in FIG. 2). As described above, a solid stator core is defined herein as a stator core that does not include a plurality of laminations. Method 710 also includes positioning 732 electric machine 50 in a gas burning appliance application.

Figure 16:
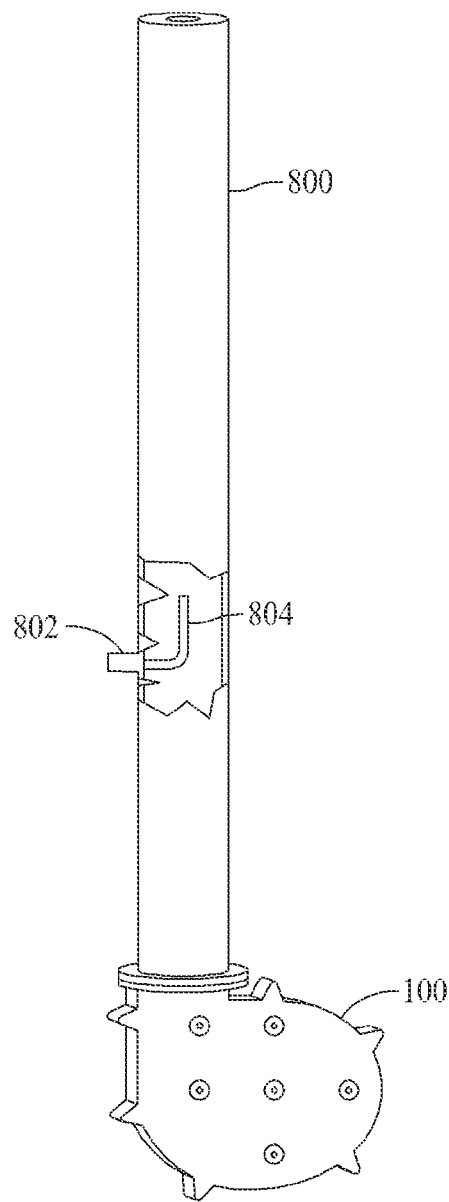
FIG. 16 is a perspective view of an exemplary embodiment of a blower test device.

FIG. 16 is a perspective view of an exemplary embodiment of a blower test device 800. In the exemplary embodiment, blower test device 800 is coupled to a blower system, for example, blower system 100 (shown in FIG. 3). In the exemplary embodiment, blower test device 800 includes an orifice 802 that provides at least one sensor 804 with access to a column of air affected by blower system 100. Sensor 804 is configured to measure, for example, but not limited to, a barometric pressure, a static pressure, a differential pressure, a dry bulb temperature and/or a wet bulb temperature. Sensor 804 provides measurements to, for example, a computer (not shown in FIG. 16) for analysis of the measurements.

Figure 17:
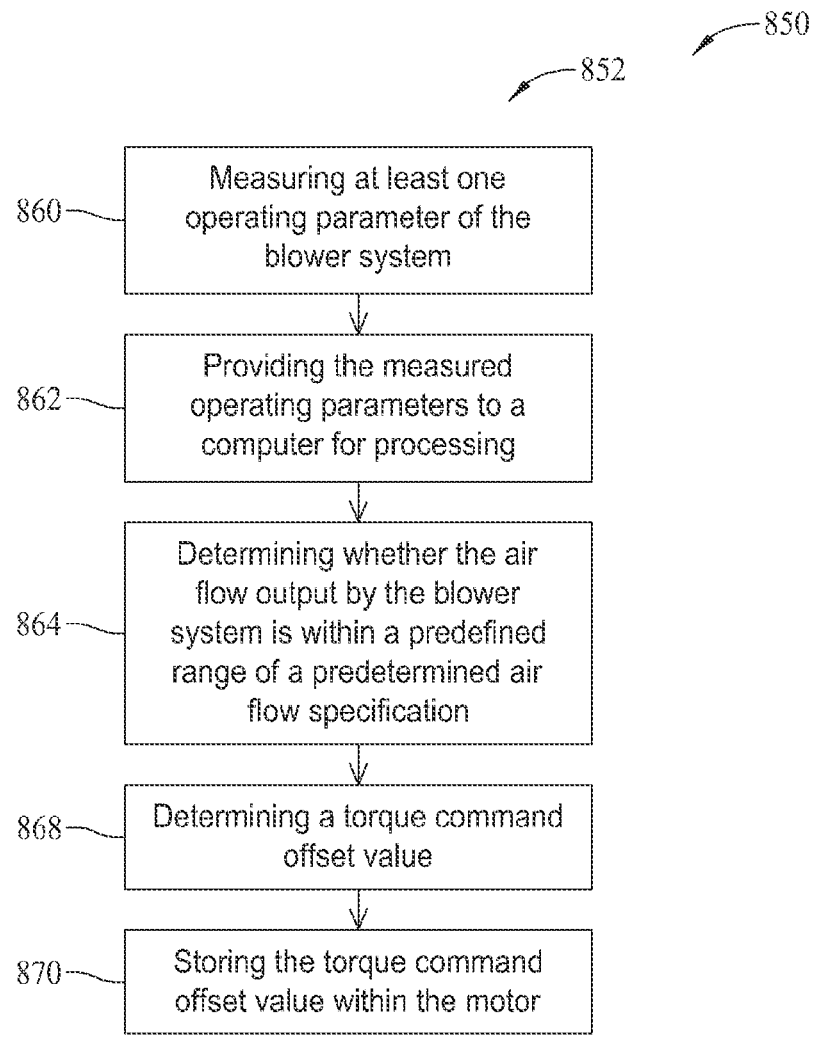
FIG. 17 is a flow chart of an exemplary embodiment of a method for calibrating a blower system, for example, the blower system shown in FIG. 3.

FIG. 17 is a flow chart 850 of an exemplary embodiment of a method 852 for calibrating a blower system, for example, blower system 100 (shown in FIG. 3). As described above, in the exemplary embodiment, blower system 100 includes a machine 50 and a blower 120. In the exemplary embodiment, method 852 includes measuring 860 at least one operating parameter of blower system 100 while providing machine 50 with a predefined torque command. Measuring 860 may be performed by blower test device 800 (shown in FIG. 16). The at least one operating parameter may include, but are not limited to, an air flow characteristic such as a barometric pressure, a static pressure, a differential pressure, a dry bulb temperature, and/or a wet bulb temperature. Other operating parameters may be measured 860 including, for example, but not limited to, a motor drive shaft speed.

In the exemplary embodiment, method 852 also includes providing 862 the measured operating parameters to a computer for processing. Method 852 also includes determining 864 whether the air flow output by blower system 100 is within a predefined range of a predetermined air flow specification. For example, method 852 may include determining 864 whether the air flow output by blower system 100 is within 20% of an expected output of blower system 100. In another example, method 852 may include determining 864 whether the air flow output by blower system 100 is within 5% of an expected output of blower system 100. Any range may be used that facilitates calibration of blower system 100 as described herein. If the air flow is within the predefined range, blower system 100 is determined to be properly calibrated.

In the exemplary embodiment, if the air flow is not within the predefined range, method 852 includes determining 868 a torque command offset value. In the exemplary embodiment, the torque command offset value is at least one of a positive value and a negative value. If it is determined 864 that the air flow output by blower system 100 is less than a lowest value in the range of the air flow specification, a positive torque command offset value will increase the torque applied by machine 50 to blower 120, when compared to the un-calibrated torque command, and therefore increase the air flow output of blower system 100. If it is determined 864 that the air flow output by blower system 100 is greater than the upper value in the range of the predetermined air flow specification, a negative torque command offset value will decrease the torque applied by machine 50 to blower 120 and therefore decrease the air flow output of blower system 100.

Method 852 also may include storing 870 the torque command offset value within machine 50 or within electronics associated with machine 50. For example, the torque command offset value may be provided to machine 50 using a serial connection between the computer and a memory of machine 50. The torque command offset value, in combination with the torque command provided to machine 50, drives machine 50 to provide a calibrated output air flow. Once machine 50 is operating based on the torque command offset value, measuring 860 may be repeated and a determination 864 made of whether the air flow output by blower system 100 is within the predefined range of the predetermined air flow specification.

Method 852 of calibrating blower system 100 facilitates operating blower system 100 with greater accuracy. Due to manufacturing tolerances, blower system 100, and more specifically, machine 50 and/or blower 120 may generate an output air flow that varies from a predefined expected output air flow. In order to compensate for the output air flow differences between each manufactured blower system 100, the torque offset parameter value determined using method 852 allows each blower system 100 to operate according to predefined specifications regardless of tolerances within machine 50 and/or blower 120. By calibrating blower system 100 as a whole, rather than calibrating machine 50 and calibrating blower 120 separately, a complete, calibrated blower system 100 can be provided to a customer. Calibrating machine 50 and blower 120 separately provides a machine calibrated to operate in a predefined manner and a blower calibrated to operate in a predefined manner. However, separate calibration does not account for interaction between machine 50 and blower 120, and does not specifically account for air flow provided by the combination of machine 50 and blower 120, which is a main concern of a purchaser of a blower system. Calibrating machine 50 and blower 120 ensures the purchaser is provided with blower system 100 calibrated to provide a predefined air flow. Method 852 may also generate data that may be used in quality control determinations. For example, a quality issue may be identified if more than a predefined number of blower systems 100 are determined 864 to generate an air flow that is not within the predefined range of the predetermined air flow specification.

Described herein is an exemplary axial flux machine and methods of assembling and calibrating the same. More specifically, the components of the axial flux machine, and the methods of assembling and calibrating the components, enable efficient assembly and operation of the machine. The methods and components described herein facilitate maintaining a position of permanent magnets on the rotor disk during operation of the machine. The methods and components described herein also facilitate including an axial flux sine drive machine in various gas burning appliances. The methods and components described herein also facilitate maintaining a position of the stator within the machine during operation, as well as properly aligning the stator during assembly of the machine. Furthermore, the methods and components described herein facilitate coupling stator coils to a printed circuit board for both electrical coupling of the stator coils and mechanical placement of the stator coils.

The methods and components described herein facilitate efficient and economical manufacturing and use of an axial flux machine. Exemplary embodiments of methods and components are described and/or illustrated herein in detail. The methods and components are not limited to the specific embodiments described herein, but rather, components, as well as steps of each method, may be utilized independently and separately from other components and steps described herein. Each component, and each method step, can also be used in combination with other components and/or method steps.

An electric machine described herein includes a rotor comprising a rotor disk and a plurality of permanent magnets magnetically coupled to the rotor disk. The plurality of permanent magnets have a substantially flat profile and are aligned in a substantially planar array. The electric machine also includes a stator comprising a solid stator core and a plurality of coils each wound around a coil insulating member. The stator core includes a plurality of stator teeth extending substantially parallel to an axis of rotation of the rotor.

The electric machine described herein may include a stator connection board, wherein each of the coil insulating members are coupled to the stator connection board. The stator connection board mechanically and electrically couples together the plurality of coils. The electric machine may also include at least one insulation displacement terminal to facilitate coupling the plurality of coils to the stator connection board, wherein the coil insulating member includes an opening configured to receive the at least one insulation displacement terminal. The coil insulating member may include at least one alignment post for aligning the insulation member and the stator connection board.

The electric machine described herein may also include a stator retention ring configured to secure the stator core between the stator retention ring and an end shield of the machine. The stator retention ring may include at least one stator core alignment feature configured to interact with the stator core to prevent rotation of the stator core. Furthermore, the stator core may include at least one stator core alignment feature configured to interact with the stator core retention ring to prevent rotation of the stator core.

Moreover, the rotor may also include a permanent magnet retention system that includes an outer rim integrated within the rotor disk and configured to prevent the plurality of permanent magnets from moving in a radial direction relative to the rotor disk. The permanent magnet retention system may be integrated within the rotor disk. The permanent magnet retention system may also include a permanent magnet retention ring configured to be coupled between the rotor disk and the plurality of permanent magnets. The permanent magnet retention ring is configured to maintain a position of the permanent magnets relative to the rotor disk. The rotor disk further includes at least one balancing opening that facilitate balancing of the rotor. The electric machine described herein may be configured for use in a gas burning appliance.

A method for assembling an electric machine is described herein. The electric machine includes a rotor and a stator. The stator includes a solid stator core that includes a plurality of stator teeth extending substantially parallel to an axis of rotation of the rotor. The method described herein may include magnetically coupling a plurality of permanent magnets to a rotor, wherein the rotor includes a rotor disk and the permanent magnets have a substantially flat profile and are aligned in a substantially planar array. The method may also include winding a coil around each of a plurality of coil insulating members, wherein each of the plurality of coil insulating members includes an opening. The method may also include positioning at least one of the plurality of stator teeth at least partially within the coil insulating member opening.

The method for assembling an electric machine described herein may also include magnetically coupling a permanent magnet retention ring between the rotor disk and the plurality of permanent magnets. Furthermore, the plurality of coil insulating members may be mechanically coupled to a stator connection board, and the plurality of coils may be electrically coupled by the stator connection board. The method for assembling an electric machine may also include coupling the solid stator core to a machine end shield using a stator retention ring. Furthermore, the method may include positioning the electric machine in a gas burning appliance application.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An axial flux electric machine comprising:
   an end shield;
   a housing coupled to said end shield;
   a stator core positioned within said housing and comprising a plurality of teeth that extend axially from a stator core base, said stator core further comprising a flange extending radially from said stator core; and
   a stator core retention ring positioned within said housing and coupled between said stator core and said end shield, said stator core retention ring configured to secure said stator core within said housing.

2. A machine in accordance with claim 1, wherein said stator core retention ring is positioned at least partially around an outer diameter of said stator core.

3. A machine in accordance with claim 1, wherein said flange is positioned at least partially between said end shield and said stator core retention ring.

4. A machine in accordance with claim 1, wherein said stator core comprises at least one of a soft magnetic alloy (SMA) and a soft magnetic composite (SMC) material.

5. A machine in accordance with claim 1, wherein said flange and said stator core retention ring each comprises an alignment feature configured to prevent rotation of said stator core with respect to said end shield.

6. A machine in accordance with claim 5, wherein said alignment feature is further configured to align said stator core with respect to said end shield.

7. A machine in accordance with claim 5, wherein said alignment features comprise at least one of a protrusion and a corresponding notch.

8. A machine in accordance with claim 5, wherein said stator core retention ring further comprises at least one retention ring fastener opening defined therein and said end shield further comprises at least one end shield fastener opening defined therein, wherein said alignment feature is further configured to align said at least one retention ring fastener opening and said at least one end shield fastener opening.

9. A machine in accordance with claim 8, further comprising at least one fastener configured to extend through said at least one retention ring fastener opening and at least partially into said at least one end shield fastener opening and to couple said stator core retention ring to said end shield.

10. A machine in accordance with claim 1, further comprising at least one stator connection board that includes at least one stator connection board opening defined therein, further comprising at least one fastener, wherein said at least one fastener is configured to extend through said at least one stator connection board opening, said at least one retention ring fastener opening, and at least partially into said at least one end shield fastener opening to couple said at least one stator connection board and said stator core retention ring to said end shield.

* * * * *